April 5, 1938.   W. A. RAY   2,112,998
MULTIPLE CONTROL
Filed Sept. 26, 1936
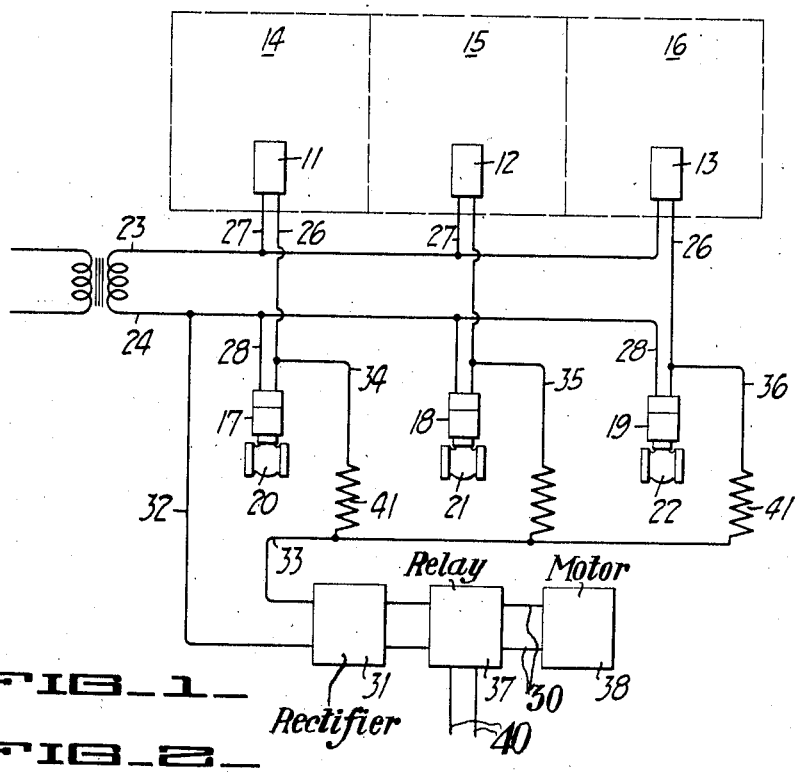
FIG_1_
FIG_2_
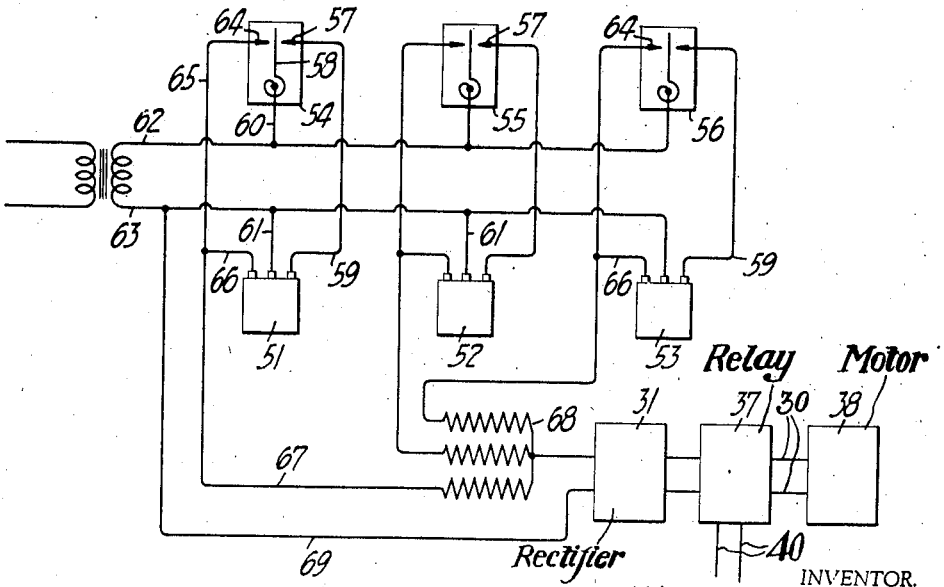
INVENTOR.
William A. Ray
BY
Robert H. Eckhoff
ATTORNEY.

Patented Apr. 5, 1938

2,112,998

UNITED STATES PATENT OFFICE 2,112,998

MULTIPLE CONTROL

William A. Ray, San Francisco, Calif., assignor to General Controls Company, a corporation of California Application September 26, 1936, Serial No. 102,754

3 Claims. (Cl. 236—1)

This invention relates to the control of a conditioning unit by any one of a plurality of condition responsive devices to the end that one responsive device does not interfere with the operation of another responsive device. For example, the present invention makes possible the selective conditioning of various remotely located spaces. In accordance with this invention this selective conditioning of the remotely located spaces is effected without the condition of one space interfering with the conditioning of another space.

It is in general the broad object to provide a suitable system permitting of the conditioning of a plurality of separate units such that the conditioning of one unit does not affect that of another.

Another object of the present invention is to provide a simple system for the separate control of a conditioning device by any one of a plurality of condition responsive devices.

The invention includes other objects and features of advantage, some of which, together with the foregoing, will appear hereinafter, wherein the present preferred systems of the invention are disclosed.

In the drawing, Figures 1 and 2 are diagrammatic views illustrating systems incorporating the principles of the present invention, and illustrating how it can be practiced.

Referring particularly to Figure 1, I have shown a plurality of condition responsive devices indicated by numerals 11, 12 and 13. Depending upon the use to which the present invention is intended to be put, these devices can be responsive to one or more of various conditions, such as pressure, temperature, humidity, viscosity or some other condition. In the present case, for purposes of discussion, it is assumed that they are thermostats, and that the dotted line areas indicated as 14, 15 and 16 surrounding each thermostat are room spaces to be maintained at certain desired temperatures.

Connected in series with each thermostat are a plurality of electric operators 17, 18 and 19 for operating the solenoid operated valve elements in valves 20, 21 and 22. The solenoid operators 17, 18 and 19 are each connected in series with the associated thermostats 11, 12 and 13, and a source of current, in this case alternating current, from lines 23 and 24. Each solenoid operator is connected to its associated thermostat by a line 26 while each thermostat is connected to one side of the power line by a line 27, while the other side of the solenoid operator is connected by line 28 to the other side of the power line.

The valves 20, 21 and 22 are used, for example, to control the supply of steam, refrigerant or other conditioning medium to the associated spaces 14, 15 and 16. Since the supplying of the associated conditioning fluid requires the operation of some other device such as a burner, a compressor motor, or a gas valve, means are provided for controlling operation thereof. In the form illustrated in the drawing, this includes an alternating current rectifier 31 connected by line 32 to one side of the alternating current source, in this case a 24 volt 60 cycle current. The other side of the rectifier is connected by line 33 and lines 34, 35 and 36 to each line 26. Upon a closing of each thermostat, current flows not only to the associated solenoid operators 17, 18 and 19, but to the rectifier as well.

For example, let us assume that thermostats 12 and 13 are set to maintain temperatures of 68 deg. F. in their respective control areas 15 and 16, while thermostat 11 is set to maintain a temperature of 72 deg. F. in associated control area 14. Let us assume the temperature in area 14 is 69 deg. F. Thermostat 11 will then close, and current will flow through solenoid operator 17 and open valve 20 so that steam can flow into the associated area 14. At the same time a current flows through line 34 and line 33 to rectifier 31 and through line 32 to the alternating current source. The rectified current operates a sensitive relay, one utilizing about 0.02 watt, for example. This relay, indicated at 37, controls operation of a conditioning device 38 such as a burner motor or a gas valve which controls the flow of fuel to a boiler, for example. The term motor is used as referring broadly to a conditioning device or a control element thereof as a burner motor or a gas valve. The boiler will generate steam which can pass under the control of valve 20 through a radiator in space 14, for example, to raise the temperature therein. The relay can control current flow to the motor through line 39 from power line 40.

In accordance with this invention, means are provided so that each one of the thermostats can selectively result in energization of the motor or other direct conditioning means indicated by numeral 38. Thus I include between line 33 and lines 34, 35 and 36 resistances 41. These resistances are so high that, for example, if solenoid operator 17 is energized, the other resistances will prevent the feeding back of sufficient current to operate solenoid operators 18 and 19. I have found that resistances of the order of 800 ohms for the voltage indicated will usually suffice. Of course, this resistance is insufficient to cut out all current feed back, but the slight amount that does pass, of the order of 0.02 ampere, is insufficient to operate the solenoid operators 17, 18 and 19. As a matter of fact, this slight feed back is desirable with solenoid type operators on alternating current for I have found that it results in demagnetization of the elements of the solenoid, effectively destroying the undesirable residual magnetism.

The rectifier employed can be any one of the rectifiers now well known, and I have successfully used the usual commercial type of copper oxide rectifier, although a thermionic tube rectifier can be used with success, although I find such a rectifier too expensive for commercial justification, since the present system must be sold competitively.

In Figure 2 I have shown the invention as applied to the control of a plurality of three wire motor operated controls 51, 52 and 53. As is well known, these controls are motor operated by a reversible motor, operation of the motor in one direction serving to open a valve, for example, and in the opposite direction serving to close the valve. In this case, thermostats 54, 55 and 56 each includes a contact 57 which, when engaged by an operating bar 58, serves to operate the motor in one direction, completing a circuit through lines 59, 60 and 61 between the thermostat motor operated valve and the source of current indicated by lines 62 and 63.

The thermostats include another contact 64, which, when engaged, permits current to pass through lines 65 and 66 to operate the associated three wire motor valve in the opposite direction, and, at the same time, to permit current to pass through line 67 to complete a circuit through rectifier 31 controlling the sensitive direct current relay 37, which in turn operates the conditioning device 38. In this case also resistances 68 are includes in series with the rectifier so that energization of one motor control by a thermostat does not result in energization of the remainder when current flows through the rectifier and back through line 69.

It will be obvious from the foregoing disclosure that devices 17, 18 and 19 and 51, 52, and 53 can be utilized in combination with each other. For example, if thermostat 12 be substituted by thermostat 55, operator 18 and valve 21 can be replaced by the motor operated control 52.

The conditioning device 38 can be any conditioning device such as a motor operating a burner, a refrigeration pump, a circulating pump or a valve controlling flow of any gas or liquid, for example a refrigerant or a fuel line.

I claim:

1. In combination, a plurality of solenoid operated valves, a plurality of thermostats, each thermostat controlling current flow to one of said solenoid operated valves from a source of alternating current, a motor, control means for said motor connected to each thermostat and to said current source including a current rectifier and a direct current relay operated thereby to control said motor, and a plurality of resistances interposed between each thermostat and said control means to prevent substantial current feed back to any other one of said solenoid operated valves.

2. In combination, a plurality of solenoid operated valves, a plurality of thermostats, each thermostat controlling current flow to one of said solenoid operated valves from a source of current common to all said solenoid operated valves, a motor, control means for effecting operation of said motor connected to each thermostat and to said common current source, and a plurality of resistances interposed between each thermostat and said control means to prevent substantial current feed back to any other one of said solenoid operated valves upon closing of a circuit to said control means and one of said valves from said common current source.

3. In combination, a plurality of electrically operated control devices, a plurality of condition responsive devices, each condition responsive device controlling the supply of current to one of said control devices from a current source common to all said devices, a motor, a motor control device for effecting operation of said motor connected to each of said condition responsive devices and to said current source, and means interposed between said motor control device and each of said condition responsive devices to prevent substantial current feed back to any other one of said control devices upon closing of a circuit to said control means and one of said control devices from said common current source.

WILLIAM A. RAY.